Figures 1, 2:
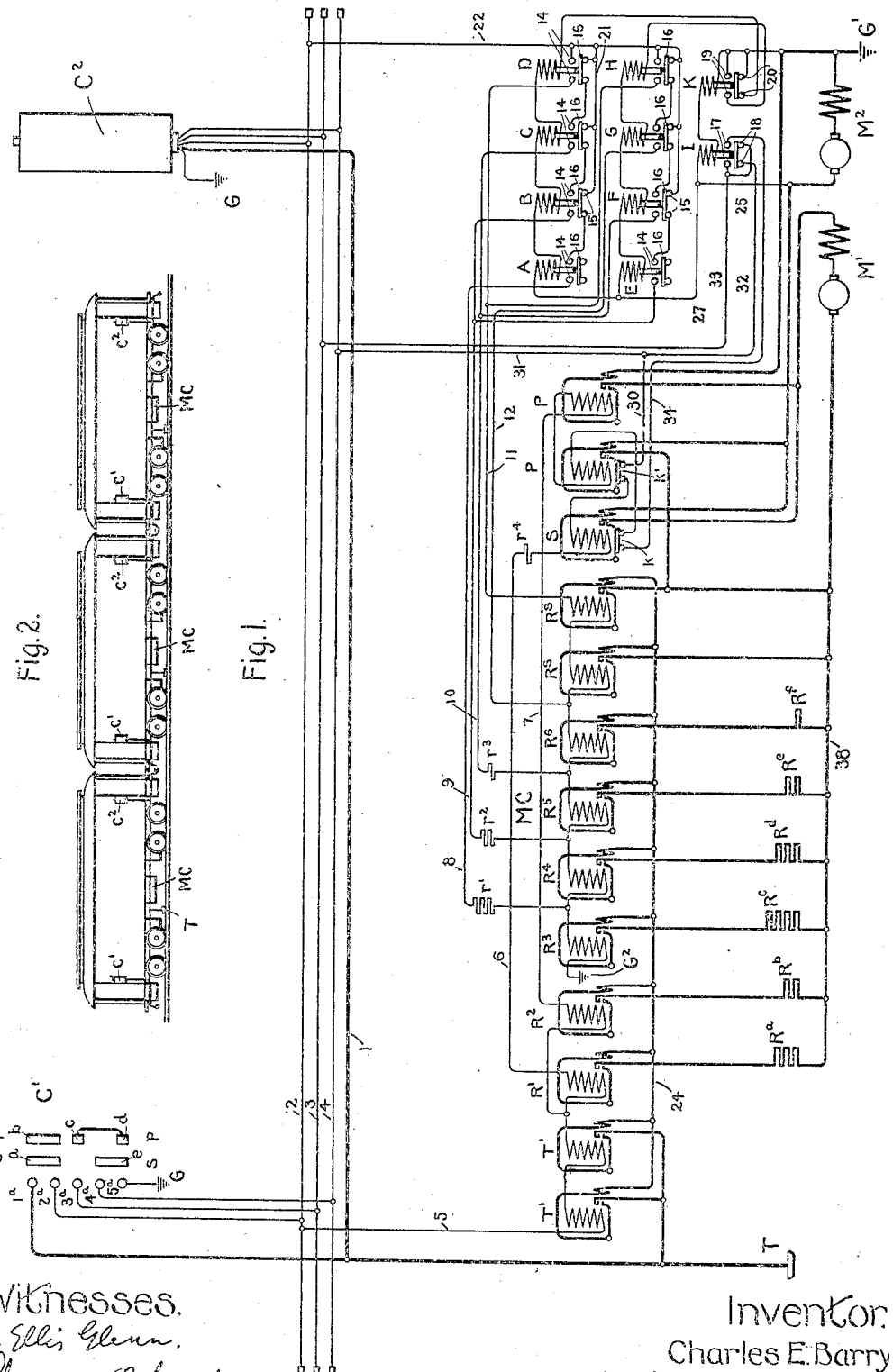

No. 770,040. PATENTED SEPT. 13, 1904.
C. E. BARRY.
MOTOR CONTROL SYSTEM.
APPLICATION FILED APR. 18, 1903.
NO MODEL.

Witnesses.
J. Ellis Glenn.
Helen Oxford.

Inventor.
Charles E. Barry
by Allen H. Davis
Atty.

No. 770,040. Patented September 13, 1904.

UNITED STATES PATENT OFFICE.

CHARLES E. BARRY, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 770,040, dated September 13, 1904.

Application filed April 18, 1903. Serial No. 153,190. (No model.)

*To all whom it may concern:*

Be it known that I, CHARLES E. BARRY, a citizen of the United States, residing at Schenectady, county of Schenectady, State of New York, have invented certain new and useful Improvements in Motor-Control Systems, of which the following is a specification.

My invention relates to systems of motor control and more particularly to systems employing a motor controller or controllers of the separately-actuated contact type, and is especially applicable to the control of a plurality of motors carried by cars or vehicles which are coupled together to form a train.

The object of my invention is to render the control system automatic in its action throughout the entire period of acceleration of the motor or motors or a predetermined part of said period and to have the rapidity with which the separate elements of the motor-controller successively operate depend upon the value of the current in the motor-circuit, or, in other words, upon the value of the counter electromotive force developed by the motor or motors in said circuit.

In accordance with my invention I employ a motor-controller of the separately-actuated contact type and control the elements or contacts of said motor-controller by means such as a plurality of relays or electromagnetically-actuated switches which are constructed and arranged to be responsive successively to the changes in the counter electromotive force developed in the motor-circuit as the motor or motors increase in speed. The actuating coils of said relays are preferably connected in series across the terminals of one of the motors in the circuit.

My invention further comprises a train-control system which includes a plurality of motor-controllers each adapted to connect the motors on a single car in series and in parallel relationship, in combination with a plurality of relays for controlling the successive operation of the elements of said motor-controllers, the said relays being so constructed and arranged that they will respond successively to the increase in the counter electromotive force generated in the circuit by the motors as the latter increase in speed through the series and parallel positions of the motor-controller. I further employ a master controlling-switch, whereby the acceleration of the motors may be arrested either in the final series or in the final parallel positions, and an automatically-actuated relay for changing the motor connections from series to parallel.

My invention will be more clearly understood by reference to the following description, taken in connection with the accompanying drawings, of which—

Figure 1 shows diagrammatically the preferred form of my invention as applied to a single vehicle or car, and Fig. 2 is a diagrammatic representation of a train of cars equipped with my invention.

Referring now to the figures of the drawings, $M'$ and $M^2$ represent motors which are adapted to be controlled by a motor-controller MC, made up of the separate electromagnetically actuated contacts $T'$, $T'$, $R'$, $R^2$, $R^3$, $R^4$, $R^5$, $R^6$, $R^s$, $R^s$, S, P, and P. These separately-actuated contacts are adapted to connect the motors in the well-known series-parallel combinations, which consist in first connecting the motors in series with each other and also in series with a current-reducing resistance, then gradually cutting said resistance out of circuit until the motors are in series without resistance, then placing the motors in parallel with each other but in series with the resistance, which is again gradually cut out of circuit until the motors are running in full parallel. The motor-controllers throughout the train are adapted to be controlled so far as the series and parallel combinations are concerned from a master-controller located at any desired position on the car or train. The contacts controlling the series connections are $T'$, $T'$, $R'$, and S. The contacts controlling the parallel connections are $T'$, $T'$, $R^2$, P, and P. These contacts, which will be referred to hereinafter as the "series-paralleling contacts," together with the resistance-controlling contacts $R^3$ to $R^6$, inclusive, and $R^s$ $R^s$ of the motor-controllers, are controlled by automatically-actuating relays in a manner to be hereinafter described. These relays may be carried in any desired part of the car, but are preferably mounted in a vertically-arranged relay-board located within the car in a readily-accessible position.

In Fig. 1 I have shown only that part of the equipment carried by a single car which is necessary to illustrate my invention. The master-controller C' at one end of the car is shown in development, as is customary in illustrating such a structure. The master-controller $C^2$ at the other end of the car is merely indicated in outline. The master-controller C' contains contact-fingers $1^a$ to $5^a$, inclusive, which are adapted to engage with the contact-segments carried on the movable member of said master-controller, said contact-segments being indicated by $a$ to $e$, inclusive. To produce series connections of the motors, the movable member is moved into the position $s$ $s$—that is, the contact-segments $a$ and $e$ are moved into engagement with the contact-fingers $1^a$, $2^a$, $4^a$, and $5^a$, while to produce the parallel connections the said movable member is turned into the position $p$ $p$—that is, the contact-segments $b$, $c$, and $d$ are moved into engagement with the contact-fingers $1^a$, $2^a$, $3^a$, and $5^a$. The train-wires 2, 3, and 4 are connected to the master-controller and to the controlling-circuits of the motor-controller, as will be hereinafter described. The sections of the resistance inserted in the motor-circuit are represented by $R^a$ to $R^f$, inclusive. The resistances which are inserted in the control-circuits to compensate for the resistance of the actuating-coils of the motor-controller contacts, so as to maintain an approximately constant current in said control-circuits, are indicated by $r'$ to $r^4$, inclusive.

To produce an automatic acceleration of the motors by reducing the resistance in the motor-circuit automatically as the motor-speed increases, I have provided a plurality of relays or electromagnetically-actuated switches connected in shunt-circuits about one of the motors. The actuating-coils of these relays therefore receive current depending upon the counter electromotive force developed by the motor, and the relays are adjusted to respond to certain successive increments of said counter electromotive force. The relays indicated by A, B, C, and D have their actuating-coils connected in series with each other in a shunt-circuit around the motor $M^2$. These relays control the operation of the resistance-contacts of the motor-controller during acceleration in series and will be hereinafter called "series-resistance relays." The said relays are constructed and arranged to operate successively and each is adapted to respond to a flow of current corresponding to a predetermined counter electromotive force generated in the motor-circuit. This successive operation of the relays may be accomplished by winding the actuating-coils differently, by using armatures or solenoid-cores of different weights, by adjustable springs, or by any other desired method. The actuating-coils of the relays are preferably wound so that the relays will be responsive to currents of different strengths and inoperative when currents of less strength flow through said actuating-coils. Thus the coil of relay A may have a greater number of turns than the coil of relay B, which in turn may have a greater number of turns than the coil of relay C, &c., so that the coil of relay A will cause said relay to operate when a certain predetermined counter electromotive force is generated by the motor $M^2$, while the relays B, C, and D will be unaffected. Relay B will operate when a predetermined greater counter electromotive force is developed, the relays C and D following in their proper order. The movable members of these relays carry bridging contacts 16, which are adapted to bridge across the contacts 15 when in their inoperative position, but when in their operative position bridge the contacts 14. As the said relays successively operate they complete circuits through the actuating-coils of the resistance-controlling contacts in the motor-controller, thus reducing the resistance of the motor-circuit and allowing the motors to increase in speed.

The relays indicated by E, F, G, and H have their actuating-coils also connected in a shunt-circuit about the motor $M^2$ and are adapted to control the resistance-contacts of the motor-controller when the motors are connected in parallel relationship and will be hereinafter called "parallel-resistance relays." These relays also are arranged to respond successively as the counter electromotive force generated in the motor-circuit increases due to further increase of speed of the motors; but they would be unaffected by the current which has previously caused the series-resistance relays to operate if said current was passed through their actuating-coils.

The electromagnetically-actuated switches I and K are the "series-parallel relays" and have their actuating-coils connected in series with each other in a shunt-circuit across the terminals of the motor $M^2$. These relays operate simultaneously and are adapted to respond to a counter electromotive force greater than that required to cause the relay D to operate. When in their inoperative positions, as shown on the drawings, these relays control the series combination of contacts in the motor-controller and also complete the circuit through the actuating-coils of the series-resistance relays, and when in their operative position they control the parallel combination of contacts in the motor-controller and complete the circuit through the actuating-coils of the parallel-resistance relays. A single relay may be used in place of the two series-parallel relays, if desired. When in its normal position, the bridging contact 16, carried by the core of the relay K, bridges the contacts 20 and completes the circuit through the actuating-coils of the series-resistance relays; but when the actuating-coil of the relay K is energized to a sufficient extent to operate the said relay the bridging-contact 16 bridges the contacts 19 and completes the circuit through the coils of the parallel-resistance relays, opening at the same time the circuit through the coils of the series-resistance relays. Although these series-parallel relays operate in the final series position of the motor-controller, they are inoperative to change the connection of the contacts of said controller from series to parallel so long as the master-controller remains in the series position.

It is sometimes desirable to move the master-controller at once from the "off" position into its parallel position and allow the motor-controller to operate automatically to cause the motors to accelerate through the series positions and also through the parallel positions without being obliged to hold the master-controller in its series position until the motor-controller connections corresponding to the final series position of said motor-controller have been completed. The contacts of the relay I are connected and arranged to accomplish this end in a manner to be hereinafter explained in describing the operation of the system.

The operation of my improved automatically-accelerating motor-control system is as follows: If the master-controller is moved into the series position $s\ s$—that is, with the contact-segment $a$ in engagement with the contact-fingers $1^a$ and $2^a$ and the contact-segment $e$ in engagement with the contact-fingers $4^a$ and $5^a$—a circuit is completed from the trolley T, through conductor 1, contact-finger $1^a$, contact-segment $a$, contact-finger $2^a$, train-wire 2, conductor 5, actuating-coils of the contacts T', T', and R' of the motor-controller, conductor 6, resistance $r^4$, actuating-coil of the contact S, the auxiliary switch $k'$, carried by one of the parallel contacts P, conductors 30 and 31, train-wire 4, contact-finger $4^a$, contact-segment $e$, contact-finger $5^a$, to ground at G. The operation of the contacts in the motor-controller when said controlling-circuit is completed causes a circuit through the motors to be completed as follows: from the trolley T, through the contacts T' T' in parallel, conductor 24, through the contact R', resistance $R^a$, conductor 38, motor M', contact S, motor $M^2$, to ground at G'. When this motor-circuit is completed, a certain amount of current flows through the shunt-circuits around the motor $M^2$ on account of the drop in potential across the motor-terminals; but this current is insufficient to cause the relays to operate. As the speed of the motors increases a counter electromotive force is developed in the motor $M^2$, and in consequence of said counter electromotive force a greater amount of current is caused to flow through the shunt-circuit which includes the actuating-coils of the series-parallel relays I and K and also through the shunt-circuit including the actuating-coils of the series-resistance relays. The coils of the series-parallel relays are so wound that so long as the motors are connected in series with each other and with an appreciable resistance the counter electromotive force developed by the motor $M^2$ is insufficient to cause the said relays to operate; but they will operate when the motors reach a speed corresponding to the final series position of the motor-controller.

When the counter electromotive force generated by the motor $M^2$ reaches that at which the relay A is set to respond, the bridging member 16, carried by the core of said relay, is moved into engagement with its contacts 14, thus bridging said contacts and completing a control-circuit from train-wire 2, through the conductor 22, conductor 21, contacts 15 of the relay B, contacts 14 of the relay A, conductor 8, resistance $r'$, actuating-coil of the contact $R^3$ of the motor-controller, to ground at $G^2$, thus operating said contact $R^3$ and reducing the resistance in the motor-circuit. The motors then increase in speed until a predetermined counter electromotive force is developed by the motor $M^2$, at which time the current through the actuating-coils of the series-resistance relays is sufficient to cause the relay B to operate. When the relay B is operated, a circuit is completed through the contacts 14 of the relay B, conductor 9, resistance $r^2$, through the actuating-coils of the contacts $R^4$ and $R^3$, to ground, while the circuit previously completed by the relay A is opened at the contacts 15 of relay B. This inserts the resistance-sections $R^c$ and $R^d$ in parallel to the resistance $R^a$, thus further reducing the resistance of the motor-circuit and causing the motors to increase still further in speed until the counter electromotive force developed causes the relays C and D to operate in succession and further reduce the resistance in the motor-circuit step by step. In the final series position, with the contact 16 of the relay D bridging the contacts 14 and the circuit previously established opened at the contacts 15 of said relay, the circuit through the actuating-coils of the motor-controller resistance-contacts may be traced as follows: from the train-wire 2, through conductor 22, contacts 14 and bridging contact 16 of the relay D, conductor 11, actuating-coils of the contacts $R^s$, $R^s$, $R^6$, $R^5$, $R^4$, and $R^3$, to ground at $G^2$. In this position the contacts $R^s$ $R^s$ act as short-circuiting contacts for the resistance in the motor-circuit.

To further increase the speed of the motor, the master-controller is moved into its parallel position, (indicated by $p\ p$,) and the control-circuit thereby completed may be traced as follows: from the trolley T, through the conductor 1, contact-finger $1^a$, contact-segment $b$, contact-finger $2^a$, train-wire 2, conductor 5, actuating-coils of the contacts T', T', and $R^2$ of the motor-controller, conductor 7, actuating-coils of the contacts P P of said controller, through the auxiliary switch-contacts $k$, carried by the series contact S, (the said contact S being opened and the auxiliary switch carried thereby closed when the master-controller is moved from the series to the parallel positions,) thence through the conductor 34, contacts 17 of the relay I, conductor 33, train-wire 3, contact-finger $3^a$, contact-segments $c$ and $d$, contact-finger $5^a$, to ground at G. In tracing the above circuit it must of course be understood that the counter electromotive force developed by the motor $M^2$ after the operation of the relay D has increased sufficiently to cause the relay I to operate. The motors are thus connected in parallel with each other, but in series with the resistance-section $R^b$.

Simultaneously with the operation of relay I the relay K is operated, thereby moving the bridging member 16, carried by the core of said relay, so as to engage the contacts 19 and connect the actuating-coils of the parallel-resistance relays E, F, G, and H in a shunt-circuit about the motor $M^2$ and open the circuit through the actuating-coils of the series-resistance relays A, B, C, and D. When a sufficient counter electromotive force has been developed by the motor $M^2$ to cause the actuating-coil of the relay E to move the bridging member 16 of said relay into engagement with the contacts 14, a circuit is completed from the train-wire 2, through the conductor 22, contacts 15 of the relay F, contacts 14 of relay E, conductor 9, resistance $r^2$, actuating-coils of the contacts $R^4$ and $R^3$ of the motor-controller, to ground at $G^2$, thus operating said motor-controller contacts to decrease the resistance of the motor-circuit. The speed of the motors will thus increase until sufficient counter electromotive force is developed by the motor $M^2$ to cause the actuating-coils of the parallel-resistance relays F, G, and H to operate successively to further reduce the resistance of the motor-circuit. In the final parallel position the circuit through the actuating-coils of the contacts of the motor-controller may be traced from the train-wire 2, through the conductor 22, contacts 14 and bridging contact 16 of the relay H, conductor 11, actuating-coils of the contacts $R^8$ $R^7$ $R^6$ $R^5$ $R^4$ $R^3$ in series, to ground at $G^2$, the same as in the final series position.

It will be seen that if the master-controller is moved immediately into its parallel position from its initial or off position the motor-controller contacts connect the motors at first in series relation with resistance in series therewith, then the resistance of the motor-circuit is automatically reduced step by step by the operation of the series-resistance relays A, B, C, and D successively, then by the operation of the relays I and K the control-circuit is changed so as to operate the motor-controller contacts to connect the motors in parallel relationship and simultaneously increase the amount of resistance inserted in the motor-circuit, then the parallel-resistance relays E, F, G, and H operate successively to reduce the resistance in the motor-circuit and allow the motors to automatically accelerate to the maximum rate of speed.

In the diagrammatic illustration in Fig. 2 I have shown the location of the master-controllers C' and $C^2$ and the motor-controllers MC. The group of relays for each motor-controller may be mounted on a relay-board and located in any desired part of the car.

The relays are adapted to operate on a very small current and may be constructed and arranged to occupy a very small space. Each relay should be delicately adjusted, so as to respond promptly to a predetermined counter electromotive force, and thus cause a positive and prompt closing of the individual contacts of the motor-controller—a condition which is desirable in the operation of a system of this type.

The specific construction of the contacts of the motor-controller forms no part of my present invention, and for a detail description of the preferred form of said contacts reference may be had to the patent to F. E. Case, granted December 16, 1902, No. 716,189.

I aim to cover in the appended claims all modifications which do not depart from the spirit and scope of my invention.

What I claim as new, and desire to secure by Letters Patent of the United States, is—

1. In a motor-control system, a motor, a motor-controller built up of a plurality of separately-actuated contacts, means for operating said contacts, and a plurality of relays for controlling said contact-operating means automatically and successively, said relays being adjusted to respond to certain successive increments of counter electromotive force in the motor-circuit as the motor increases in speed.

2. In a motor-control system, a motor, a motor-controller built up of a plurality of separately-actuated contacts, means for operating said contacts, a plurality of relays for controlling said contact-operating means automatically, said relays being so constructed and arranged as to respond to certain successive increments of counter electromotive force in the motor-circuit as the motor increases in speed, and a master controlling-switch for said relays.

3. In a motor-control system, a plurality of motors, a motor-controller of the separately-actuated-contact type, series-resistance relays for controlling the automatic progression of the resistance-controlling contacts of the motor-controller when the motors are connected in series, parallel-resistance relays for controlling the automatic progression of the resistance-controlling contacts when the motors are connected in parallel, and a master-controller for said motor-controller and relays.

4. In a motor-control system, a plurality of motors, a motor-controller of the separately-actuated-contact type having resistance-contacts and series-paralleling contacts, series-resistance relays for automatically controlling the resistance-contacts when the motors are in series, parallel-resistance relays for automatically controlling the resistance-contacts when the motors are in parallel, and a relay for controlling the operation of said series-paralleling contacts.

5. In a motor-control system, a motor-controller of the separately-actuated-contact type having resistance-contacts and series-paralleling contacts, means responsive to definite successive increments of counter electromotive force in the motor-circuit during acceleration in series for operating the resistance-contacts to reduce the resistance of the motor-circuit, means responsive to successive increments of counter electromotive force in the motor-circuit during acceleration in parallel to operate the resistance-contacts to reduce the resistance of the motor-circuit, and automatically-actuated means for connecting one of said means in operative relationship to one of the motors in said circuit and for simultaneously disconnecting the other of said means from such relationship.

6. In a motor-control system, the combination of a plurality of motors, a motor-controller of the separately-actuated-contact type adapted to connect said motors in series and in parallel relationship, a resistance controlled by certain of said contacts and adapted to be inserted in the motor-circuit during acceleration in series and also during acceleration in parallel, a plurality of series-resistance relays so constructed and arranged as to respond to successive increments of counter electromotive force generated in the motor-circuit during acceleration in series to operate the resistance-contacts to reduce the resistance of the motor-circuit, and a plurality of parallel-resistance relays so constructed and arranged as to respond to successive increments of counter electromotive force generated in the motor-circuit during acceleration in parallel to operate the resistance-contacts to reduce the resistance of the motor-circuit.

7. In a motor-control system, the combination of a plurality of motors, a resistance, a motor-controller of the separately-actuated-contact type adapted to connect said motors in series and in parallel relationship and control said resistance, a plurality of series-resistance relays so constructed and arranged as to respond to successive increments of counter electromotive force generated in the motor-circuit during acceleration in series to operate the resistance-contacts, a plurality of parallel-resistance relays so constructed and arranged as to respond to successive increments of counter electromotive force generated in the motor-circuit during acceleration in parallel to operate the resistance-contacts, and an automatically-operated relay adapted to cut out said series-resistance relays after the last one of said relays has operated and simultaneously cut in said parallel-resistance relays.

8. In a motor-control system, a plurality of motors, and a controller for said motors having a plurality of separately-actuated contacts adapted to connect said motors in series or in parallel, in combination with a relay having its actuating-coil connected in a shunt-circuit about one of the motors and adapted to respond to a certain counter electromotive force generated in said motor-circuit, said relay being so connected to certain of the contacts of said motor-controller as to change the motor connections from series to parallel when operated.

9. In an automatically-accelerating system of motor control, a motor-controller of the separately-actuated-contact type having resistance-contacts and series-paralleling contacts, series-resistance relays having their actuating-coils connected in shunt-circuit about one of the motors, parallel-resistance relays having their actuating-coils connected in an independent shunt-circuit about said motor, and a switch for opening one of said shunt-circuits and closing the other.

10. In an automatically-accelerating system of motor control, a motor-controller of the separately-actuated-contact type having resistance-contacts and series-paralleling contacts, series-resistance relays having their actuating-coils connected in a shunt-circuit about one of the motors, parallel-resistance relays having their actuating-coils connected in an independent shunt-circuit about said motor, and an automatically-actuated relay for opening one of said shunt-circuits and simultaneously closing the other, the actuating-coil of said relay being connected in a shunt-circuit around said motor.

11. In an automatically-accelerating motor-control system, a motor-controller of the separately-actuated-contact type having resistance-contacts and series-paralleling contacts, a plurality of series-resistance relays constructed and arranged to operate successively as the counter electromotive force of the motor increases during acceleration in series, a plurality of parallel-resistance relays so constructed and arranged as to operate successively as the counter electromotive force in the motor-circuit increases during acceleration in parallel, and an automatically-actuated switch so constructed and arranged as to operate after the last one of said series-resistance relays operates to cut said series-resistance relays out of circuit and cut in said parallel-resistance relays.

12. In an automatically-accelerating motor-control system, a motor-controller of the separately-actuated-contact type having resistance-contacts and series-paralleling contacts, a plurality of series-resistance relays constructed and arranged to operate successively as the counter electromotive force of the motor increases during acceleration in series, a plurality of parallel-resistance relays so constructed and arranged as to operate successively as the counter electromotive force in the motor-circuit increases during acceleration in parallel, an automatically-actuated relay so constructed and arranged as to operate after the last one of said series-resistance relays operates to cut said series-resistance relays out of circuit and cut in said parallel-resistance relays, and a switch adapted to operate simultaneously with the operation of the last-mentioned relay for operating said series-paralleling contacts to change the connections of the motors from series to parallel.

13. In a motor-control system, a plurality of motors, a motor-controller of the separately-actuated-contact type comprising resistance-contacts and series-paralleling contacts, series-resistance relays and parallel-resistance relays responsive to definite successive increments of counter electromotive force in the motor-circuit during acceleration in series and in parallel respectively, an automatically-actuated relay for operating said series-paralleling contacts to change the connections of the motors from series to parallel after the last of said series-resistance relays has operated, and a master-controller for rendering the series-paralleling relay inoperative.

14. In a train-control system, a plurality of motors mounted on the cars or vehicles constituting the train, and a plurality of series-parallel motor-controllers of the separately-actuated-contact type, in combination with a plurality of relays for controlling the successive operation of the elements of said motor-controllers, said relays being so constructed and arranged as to respond successively to the increase in counter electromotive force generated in the motor-circuits as the motors increase in speed through the series and parallel positions of the motor-controllers.

15. In a train-control system, a plurality of motors mounted on the cars or vehicles constituting the train, a plurality of series-parallel motor-controllers of the separately-actuated-contact type, in combination with a plurality of relays for controlling the successive operation of the elements of said motor-controllers, said relays being so constructed and arranged as to respond successively to the increase in counter electromotive force generated in the motor-circuits as the motors increase in speed through the series and parallel positions of the motor-controllers, and an automatically-actuated relay operatively connected to each motor-controller for changing the motor connections from series to parallel.

16. In a train-control system, a plurality of motors mounted on the cars or vehicles constituting the train, a plurality of series-parallel motor-controllers of the separately-actuated-contact type, in combination with a plurality of relays for controlling the successive operation of the elements of said motor-controllers, said relays being so constructed and arranged as to respond successively to the increase in counter electromotive force generated in the motor-circuits as the motors increase in speed through the series and paralleling positions of the motor-controllers, an automatically-actuated relay operatively connected to each motor-controller for changing the motor connections from series to parallel, and a master controlling-switch located at any desired point on the car or train whereby the acceleration of the motors may be arrested either in the final series or the final parallel positions.

17. In a train-control system, a plurality of motors, motor-controllers of the separately-actuated-contact type each adapted to control the motors mounted on a single car of the train, a group of relays carried by each car adapted to operate the contacts of the motor-controller on that car automatically, said relays being constructed and arranged to respond to certain successive increments of counter electromotive force generated in the motor-circuit of that car, and a master-controller for said relays.

18. In a train-control system, a plurality of motors, motor-controllers of the separately-actuated-contact type each adapted to control the motors mounted on a single car of the train, a group of relays carried by each car adapted to operate the contacts of the motor-controller on that car automatically, said relays being constructed and arranged to respond to certain successive increments of counter electromotive force generated in the motor-circuit of that car, train-wires to which said relays are connected, and a master-controller connected to said train-wires whereby the acceleration of all the motors on the train may be arrested either in the final series or in the final parallel position.

In witness whereof I have hereunto set my hand this 15th day of April, 1903.

CHARLES E. BARRY.

Witnesses:
   BENJAMIN B. HULL,
   MARGARET E. WOOLLEY.